United States Patent [19]

Barrable

[11] 4,132,555

[45] Jan. 2, 1979

[54] BUILDING BOARD

[75] Inventor: Victor E. Barrable, Gerrards Cross, England

[73] Assignee: Cape Boards & Panels Ltd., Uxbridge, England

[21] Appl. No.: 738,688

[22] Filed: Nov. 4, 1976

Related U.S. Application Data

[63] Continuation of Ser. No. 538,197, Jan. 2, 1975, abandoned.

[51] Int. Cl.$^2$ .............................................. C04B 7/02
[52] U.S. Cl. ....................................... 106/90; 106/93; 106/99; 106/104; 106/120
[58] Field of Search .................... 106/99, 119, 120, 90, 106/93, 104

[56] References Cited

U.S. PATENT DOCUMENTS

| | | | |
|---|---|---|---|
| 3,501,323 | 3/1970 | Moorehead | 106/99 |
| 3,645,961 | 2/1972 | Goldfein | 106/99 |
| 3,716,386 | 2/1973 | Kempster | 106/90 |
| 3,758,319 | 9/1973 | Ergene | 106/90 |
| 3,827,895 | 8/1974 | Copeland | 106/99 |
| 3,841,885 | 10/1974 | Jakel | 106/99 |
| 3,847,633 | 11/1974 | Race | 106/99 |
| 3,901,991 | 8/1975 | Ueda et al. | 106/120 |
| 3,926,653 | 12/1975 | Shannon et al. | 106/120 |
| 3,965,020 | 6/1976 | Noll et al. | 106/120 |

*Primary Examiner*—James Poer
*Attorney, Agent, or Firm*—Diller, Ramik & Wight

[57] ABSTRACT

A composition suitable for the manufacture of shaped articles comprising (i) a water-settable inorganic binder which is one or more of a calcium silicate binder, Portland cement, aluminous cement, and blast furnace slag cement, and (ii) fibrous reinforcing material, wherein the fibrous reinforcing material is free from asbestoc fibres and includes organic fibres which do not melt below 140° C.

15 Claims, No Drawings

BUILDING BOARD

This is a continuation of application Ser. No. 538,197 filed Jan. 2, 1975, now abandoned.

This invention relates to shaped articles, especially building boards, and is primarily concerned with providing a novel composition from which fire-resistant shaped articles, e.g. building boards may be made. The invention also relates to the shaped articles made therefrom.

Many forms of building board are known and sold nowadays, most of which, in order to give a measure of fire-resistance, incorporate asbestos fibres. It is an object of the present invention to provide an asbestos-free composition from which building boards and other shaped articles may be manufactured.

According to the present invention a composition suitable for the manufacture of shaped articles comprise (i) a water-settable inorganic binder which is one or more of a calcium silicate binder, Portland cement, aluminous cement and blast furnace slag cement, and (ii) fibrous reinforcing material, wherein the fibrous reinforcing material is free from asbestos fibres and includes fibres which do not melt below 140° C.

The term "water-settable binder" used herein means a binder which is caused to set by the action thereon of $H_2O$ in any of its forms, i.e. water, atmospheric moisture, steam.

The composition of the invention may be used in the manufacture of all kinds of shaped articles, such as slabs, blocks, pipe sections and the like. It is especially suitable for manufacturing building boards, and will be described in relation thereto hereinafter. It should be noted that when we refer herein to "building boards" we mean this term in its widest sense, i.e. as denoting boards for use in any building construction. Thus, the term embraces, for example, boards for use in ships, known as marine boards.

The organic fibres in the reinforcement are preferably cellulosic fibres, and examples of suitable cellulosic processes, i.e. sulphate, sulphite and mechanical pulps, waste wood pulps of all types, jute, flax, cotton, straw, esparto grass, hemp, romie and bagasse. Other suitable organic fibrous reinforcing materials include polyamide fibres, for example Nylon, polyester fibres, for example polyethylene terephthalate ("Terylene"), polypropylene fibres, carbon fibres and viscose fibres. The fibrous reinforcing material may be exclusively organic in nature, or it may contain additional, i.e. inorganic, fibrous reinforcing materials. Depending on the additional reinforcing materials, and also on the purpose for which the shaped articles to be made from the composition are to be used, the reinforcing material may contain anything from 5% by weight to 100% by weight of organic fibrous material. Although the organic fibrous material is used primarily for reinforcement purposes, it does add an element of fire-resistance to articles made from the compositions. Enhanced fire-resistance may be obtained by the additional inorganic fibrous reinforcing materials, used in conjunction with the organic fibres, and these include mineral wool fibres such as glass fibres (this includes alkali-resistant glass fibres), slag wool fibres, rock wool fibres, ceramic fibres such as zirconium oxide fibres and alumina fibres, silica-alumina fibres, aluminium silicate fibres and metal fibres. Any or all such fibres may be coated with, for example, alkali-resistant materials. When these additional fibrous reinforcing materials are used they are preferably used in amounts from 95–0.5%, suitably 40–10%, by weight based on the total weight of fibrous reinforcing material.

The inorganic binder is a water-settable calcium silicate binder, Portland cement, aluminous cement or blast furnace slag cement, or a mixture of any two or more of these. By calcium silicate we mean any of the family of autoclaved or non-autoclaved binders made from a combination of siliceous component (i.e. a material containing reactive silica, e.g. PFA, quartz, sand, clay, diatomite and calcerous component (i.e. any mineral, raw material or waste product containing more than 30% of CaO, e.g. lime). Calcium silicate binders are preferred in accordance with the invention, and of those the calcium silicates which have the crystal structure of tobermorite or xonotlite are preferred.

Preferably the binder or cement forms between 50 and 99% by weight of the total weight of binder and reinforcing fibre, the fibre being present in an amount of 1 to 50% on the same basis. Preferably the binder comprises 70–90% by weight of the binder/fibre total weight.

Examples 3, 9, 15 and 17 show the use of vermiculite in an amount of 12–50% by weight of the product and a binder in an amount of 80–89% by weight of binder and reinforcing fiber.

For some purposes other filler materials may also be present in the composition, and when present they may be used in amounts up to 50% by weight, based on the total solids content of the composition. Typical fillers include granular, cellular and fibrous fillers such as perlite, mica, vermiculite, kieselguhr, clays and clay wastes, carbonates such as chalk, dolomites and magnesium carbonate, wollastonite and other calcium silicate fillers. Vermiculite is a particularly preferred ingredient, and confers on the articles made using the composition very desirable fire resistant properties. It should also be remarked that the kieselguhr clay and clay wastes, if they contain reactive silica, may constitute a component of the binder.

When making building boards from compositions according to the invention it is normal practice first to form an aqueous slurry of the composition. This aqueous slurry will normally have a solids content of 3 to 20% or higher, e.g. 30% by weight. The slurry may be heated slightly, e.g. to 25 to 45° C., and may contain small amounts of such additional ingredients as flocculants to control raw material retention and as filtration aids (such as polyacrylamids), water retention aids, hydromodifiers (e.g. carboxymethyl cellulose derivatives, polyethylene oxides), wetting agents (e.g. detergents), and setting controlling agents (e.g. calcium chloride and ligno sulphonates).

The slurry may then be formed into boards by any of the known processes for making building boards from fibre-reinforced cements. These include (a) the Hatschek process, (b) the Magnani process, (c) the use of a simple press and (d) The Fourdriner process, all of which processes dewater the boards to an extent which makes them easily handleable. After the boards have been manufactured by any of these basically known techniques, the binder or cement is allowed to set off. This may be done by autoclaving, for example when the binder is a "calcium silicate" binder, or, if the binder is an inorganic cement, by air curing or by steam heating in an oven at 80 to 90° C. and then maturing at room temperature or in heated rooms in the presence of humidity until products are obtained having the desired properties. The boards may then be immediately dried if desired.

The initial slurry will normally be made up by hydrapulping and dispersing the fibrous materials which go into the composition in water, followed by the addition of the other, powdered materials to form a slurry of approximately water:solid ratio of 5:1 to 10:1. The slurry is then further diluted with water to give a water:solids ratio of approximately 25:1. Boards are then made from the latter slurry by dewatering on the relevant machine to give a water:solids ratio of approximately 1:1.

When shaped articles other than building boards are to be manufactured the composition is compounded so as to have a viscosity appropriate to the particular manufacture involved. Thus, for making pipe sections the composition would be substantially more viscous than for making boards.

In certain cases it may be of advantage to form the inorganic binder just prior to mixing with the fibre, particularly when it is of the calcium silicate type. Thus, for example, lime (the calcareous component) and quartz (the siliceous component) may be pre-reacted in a stirred autoclave to produce tobermorite. The fibrous filler material, and any other filler material, is then stirred in to the aqueous system of tobermorite, which is then formed in to the required shape, further autoclaved, dewatered and dried.

In a further embodiment a slurry of calcium silicate binder, reinforcing organic fibre and water is prepared, and to this slurry is added freshly prepared tobermorite or xonotlite. The mixture is then shaped, dewatered, autoclaved and dried as before.

The following Examples are given for the purpose of illustrating the invention. All parts are parts by weight.

EXAMPLE 1

10 parts cellulose fibres are dispersed in water and hydrapulped, and 42 parts lime, 38 parts quartz and 10 parts Portland cement are added to form a slurry of approximately water:solids ratio of 10:1. The slurry was thoroughly mixed and further diluted with water to give a water:solids ratio of approximately 25:1. The slurry was formed into boards by dewatering on a Hatschek machine, to give a water:solids ratio of approximately 1:1. The formed boards were autoclaved at 135 p.s.i. for 24 hours, and the resulting boards had a density of 755 kg./m$^3$ and a modulus of rupture of 10.6 N/mm$^2$.

EXAMPLE 2

A mixture of 10 parts cellulose fibres and 5 parts polyester fibres were dispersed in water, followed by the addition of 38.4 parts lime, 34.6 parts quartz, 5 parts Portland cement and 7 parts perlite, to give a slurry of water:solids ratio approximately 10:1. The slurry was treated as described in Example 1, and the density of the resulting boards was 605 kg./m$^3$ and they had a modulus of rupture of 8.7 N/mm$^2$.

EXAMPLE 3

Using precisely the same technique as described in Example 2, boards were made from a slurry containing 6 parts cellulose fibres, 6 parts "Cemfil" (Registered Trade Mark) alkali resistant glass fibres, 37.7 parts lime, 15.8 parts quartz, 21.5 parts diatomite and 13.0 parts vermiculite. The boards were autoclaved at 150 p.s.a. for 18 hours, and the resulting products had a density of 710 kg./m$^3$ and a modulus of rupture of 8.6 N/mm$^2$.

Similar results were obtained when the boards were made on a Magnani machine and on a press.

EXAMPLE 4

In a similar manner to that described in Example 2, boards were made from an aqueous slurry containing 6 parts cellulose fibres, 10 parts sisal, 39 parts lime, 35 parts quartz and 10 parts xonotlite. The boards, produced on a Hatschek or Magnani machine, were autoclaved at 180 p.s.i. for 7 hours and had a density of 725 kg./m$^3$ and a modulus of rupture of 10.3 N/mm$^2$.

EXAMPLE 5

Using the technique described in Example 1, boards were made from an aqueous slurry containing 10 parts cellulose fibres, 50 parts lime and 49 parts quartz. The boards, made on a Hatschek machine, were autoclaved at 250 p.s.i. for 7 hours and had a density of 712 kg./m$^3$ and a modulus of rupture of 8.4 N/mm$^2$.

EXAMPLE 6

Using the technique described in Example 3, boards were made from an aqueous slurry comprising 5 parts cellulose fibres, 5 parts "Cemfil" fibres, 50 parts lime, 34 parts quartz and 6 parts Portland cement. The boards, made on a Hatschek machine, were autoclaved at 350 p.s.i. for 2 hours and have a density of 737 kg./m$^3$ and a modulus of rupture of 6.5 N/mm$^2$.

EXAMPLE 7

Again using the technique of Example 3, boards were made from an aqueous slurry comprising 4 parts "Cemfil" fibres, 12 parts cellulose fibres, 47 parts lime and 37 parts quartz. The boards, produced both on Hatschek and Magnani machines, were autoclaved at 150 p.s.i. for 18 hours and had a density of 680 kg./m$^3$ and a modulus of rupture of 8.2 N/mm$^2$.

EXAMPLE 8

Using a similar technique to that described in the preceding Examples, building boards were made, on a Magnani machine, from an aqueous slurry comprising 10 parts cellulose fibres, 5 parts viscose rayon fibres, 46 parts lime and 39 parts quartz. The boards were autoclaved at 120 p.s.i. for 24 hours, and had a density of 700 kg./m$^3$ and a modulus of rupture of 7.5 N/mm$^2$.

EXAMPLE 9

Again using a similar technique to that described above, building boards were produced, on a press, from an aqueous slurry containing 10 parts cellulose fibres, 50 parts vermiculite, 21 parts lime and 19 parts quartz. The boards were autoclaved at 150 p.s.i. for 36 hours, and had a density of 600 kg./m$^3$ and a modulus of rupture of 6.5 N/mm$^2$.

EXAMPLE 10

80 Parts tobermorite were produced by pre-reacting 100 parts lime and 85 parts quartz in a stirred autoclave at 120 p.s.i. for 8 hours. To the aqueous slurry of tobermorite produced were added 10 parts cellulose fibres and 10 parts mineral wool fibres, and the ingredients were thoroughly stirred in. Sufficient water was present to give a water:solids ratio of approximately 25:1. Building boards were produced from this slurry by dewatering the slurry on a press, following which the shaped boards were allowed to dry. Further autoclaving was not required, and the resulting boards had a density of 550 kg./m$^3$ and a modulus of rupture of 3.9 N/mm$^2$.

By virtue of the particular process described hereinabove it is possible to make building boards of substantial strength, e.g. having a modulus of rupture of above 3.0 N/mm$^2$, and a density within the range 30–60 lbs./ft$^3$.

EXAMPLES 11–16

Following the basic technique described in Example 1, building boards were manufactured from the ingredients and using the autoclaving conditions set out in the following Table. Thus, the cellulose fibres were dispersed in water and hydrapulped, the remaining ingredients were added and the resulting slurry thoroughly mixed and further diluted. It was formed into boards using the method listed and the boards were autoclaved and exhibited the properties shown.

The "MFT" crack test (micro fire test) was carried out as follows. A block of each product, of approx. 4" diameter and ⅜" thickness, was heated at the rate prescribed by BSS476, Part 8 (1972). The time taken for the first crack to appear, from the beginning of heating, was noted and is expressed in the last line of the Table.

| Reactants and properties | Example 11 | Example 12 | Example 13 | Example 14 | Example 15 | Example 16 | Example 17 |
|---|---|---|---|---|---|---|---|
| Cellulose (% by weight) | 7.5 | 7.5 | 17 | 17 | 12.0 | 12.0 | 10.0 |
| E-glass (unfilamentised)(%) | 10.0 | | | | | | |
| Lime (%) | 31.7 | 35.5 | 13.9 | 19.9 | 31.8 | 36.8 | 42.0 |
| Quartz " | 30.5 | 34.2 | 44.1 | 63.1 | 29.2 | 33.8 | 21.0 |
| Diatemite " | 20.3 | 22.8 | | | | | |
| Mineral fibre* " | | | 25 | | | | |
| Vermiculite " | | | | | 12.0 | 17.4 | 12.0 |
| Cement " | | | | | 15.0 | | 15.0 |
| Method of manufacture | Press | Press | Hatschek or Magnani | Hatschek or Magnani | Hatschek or Magnani | Hatschek or Magnani | Hatschek or Magnani |
| Autoclaving conditons | 85psi/16hrs | 85psi/16hrs | 50psi/20hrs | 50psi/20hrs | 135psi/24hrs | 135psi/24hrs | 135psi/24hrs |
| Density (kg/m$^3$) | 770 | 790 | 675 | 725 | 725 | 740 | 715 |
| Modulus of Rupture(N/mm$^2$) | 7.8 | 9.6 | 6.0 | 9.7 | 12 | 12.5 | 5.5 |
| MFT crack (minutes) | 24 | 10 | 35 | 15 | 15 | 5 | 20 |

*The mineral fibre used was a rock wool fibre sold under the trade name "Rocksil".

What I claim is:

1. An asbestos-free building board or like product which can be used to provide a fire-resisting structure, made from a composition which comprises water-settable binder, reinforcing fibers including organic fibers and exclusive of asbestos fibers, and vermiculite in amount sufficient to confer fire-resistant properties to the product, said vermiculite being present in amount of about 12% to 50% by weight of the product.

2. A building product as defined in claim 1 wherein said vermiculite is present in amount of 12% by weight of the product.

3. A building product as defined in claim 1 wherein said vermiculite is present in amount of 13% by weight of the product.

4. A building product as defined in claim 1 wherein said vermiculite is present in amount of 50% by weight of the product.

5. A building product as defined in claim 1 wherein said binder is calcium silicate hydrate.

6. A building product as defined in claim 5 wherein said organic fibers are cellulosic fibers.

7. A building product as defined in claim 4 wherein said organic fibers are cellulosic fibers.

8. A building product as defined in claim 1 wherein said binder is calcium silicate hydrate having the crystal structure of tobermorite or xonotlite.

9. An asbestos-free building board or like product which can be used to provide a fire-resisting structure, made from a composition which comprises a water-settable binder, reinforcing fibers including at least 5% by weight thereof as organic fibers and exclusive of asbestos fibers, and vermiculite, said binder being present in an amount of 80–89% by weight of binder plus reinforcing fiber, and said vermiculite being present in amount of about 12% to 50% by weight of the product.

10. A building product as defined in claim 9 wherein said binder is calcium silicate hydrate.

11. A building product as defined in claim 10 wherein said organic fibers are cellulosic fibers.

12. The method of making an asbestos-free building board which can be used to provide fire-resisting structures, which comprises the steps of:
   (a) forming an aqueous slurry comprising a water-settable binder, reinforcing fibers including at least 5% by weight cellulosic fibers and exclusive of asbestos fibers, vermiculite and water, said binder being present in an amount of 50–99%, by weight, based on the total of binder and reinforcing fiber, and said vermiculite being present in amount of about 12% to 50% by weight of total solids;
   (b) dewatering said slurry to form a sheet; and then
   (c) curing said sheet to form the building board.

13. The method according to claim 12 wherein said binder is present in amount of 80–89% by weight based on binder and reinforcing fiber.

14. The method according to claim 13 wherein step (a) comprises first forming the slurry with a water:solids ratio of 5:1 to 10:1 and then diluting the slurry to a water:solids ratio of about 25:1, and wherein step (b) is performed on a Magnani machine, a Hatschek machine or a press.

15. The method according to claim 12 wherein step (a) comprises first forming the slurry with a water:solids ratio of 5:1 to 10:1 and then diluting the slurry to a water:solids ratio of about 25:1, and wherein step (b) is performed on a Magnani machine, a Hatschek machine or a press.

* * * * *